(12) United States Patent
Abe et al.

(10) Patent No.: US 7,190,389 B1
(45) Date of Patent: Mar. 13, 2007

(54) STEREO CAMERA

(75) Inventors: Tetsuya Abe, Tokyo (JP); Takayuki Sensui, Tokyo (JP)

(73) Assignee: Pentax Corporation, Tokyo (JP)

( * ) Notice: Subject to any disclaimer, the term of this patent is extended or adjusted under 35 U.S.C. 154(b) by 65 days.

(21) Appl. No.: 09/611,364

(22) Filed: Jul. 6, 2000

(30) Foreign Application Priority Data

Jul. 7, 1999 (JP) .................................. 11-193107

(51) Int. Cl.
*H04N 13/00* (2006.01)

(52) U.S. Cl. ....................................... 348/42; 382/154

(58) Field of Classification Search .................. 348/42, 348/47, 49, 218, 139, 51, 44, 36, 48, 261, 348/208, 262; 382/103, 106, 154
See application file for complete search history.

(56) References Cited

U.S. PATENT DOCUMENTS

| | | | | |
|---|---|---|---|---|
| 4,818,858 A * | 4/1989 | Sorimachi et al. | ....... | 250/203.2 |
| 5,420,438 A * | 5/1995 | Sensui et al. | .......... | 250/201.8 |
| 5,570,150 A | 10/1996 | Yoneyama et al. | | |
| 5,581,314 A | 12/1996 | Yoneyama et al. | | |
| 5,652,926 A * | 7/1997 | Saito | ........................... | 396/97 |
| 5,668,595 A * | 9/1997 | Katayama et al. | .......... | 348/218 |
| 5,748,998 A * | 5/1998 | Ishiguro et al. | ............... | 396/88 |
| 5,819,016 A * | 10/1998 | Watanabe et al. | ........... | 345/419 |
| 5,864,360 A * | 1/1999 | Okauchi et al. | .............. | 348/47 |
| 5,870,178 A * | 2/1999 | Egawa et al. | ............... | 356/3.03 |
| 5,883,662 A * | 3/1999 | Zanen | .......................... | 348/49 |
| 5,889,553 A * | 3/1999 | Kino et al. | .............. | 348/218.1 |
| 5,990,943 A * | 11/1999 | Yamazaki | .................... | 348/208 |
| 6,041,186 A * | 3/2000 | Sensui | .......................... | 396/80 |
| 6,326,994 B1 * | 12/2001 | Yoshimatsu | .................. | 348/46 |
| 6,385,334 B1 * | 5/2002 | Saneyoshi et al. | .......... | 382/154 |
| 6,449,004 B1 * | 9/2002 | Okisu et al. | .................. | 348/44 |
| 6,507,359 B1 * | 1/2003 | Muramoto et al. | ........... | 348/47 |

FOREIGN PATENT DOCUMENTS

| | | |
|---|---|---|
| EP | 0830034 | 3/1998 |
| JP | 10155104 | 6/1998 |

* cited by examiner

*Primary Examiner*—Mehrdad Dastouri
*Assistant Examiner*—Behrooz Senfi
(74) *Attorney, Agent, or Firm*—Greenblum & Bernstein, P.L.C.

(57) ABSTRACT

A stereo camera includes a pair of photographing optical systems arranged in a common plane so that a common photographing coverage occurs between a pair of photographing areas taken by the pair of photographing optical systems, an object distance measuring device, a convergence angle adjustment mechanism adapted to vary an angle of convergence defined by, and between, the optical axes of the pair of photographing optical systems, so as to adjust an amount of common photographic coverage of the pair of photographing optical systems, and a controller adapted to control the convergence angle adjustment mechanism in accordance with object distance data obtained by the object distance measuring device.

7 Claims, 11 Drawing Sheets

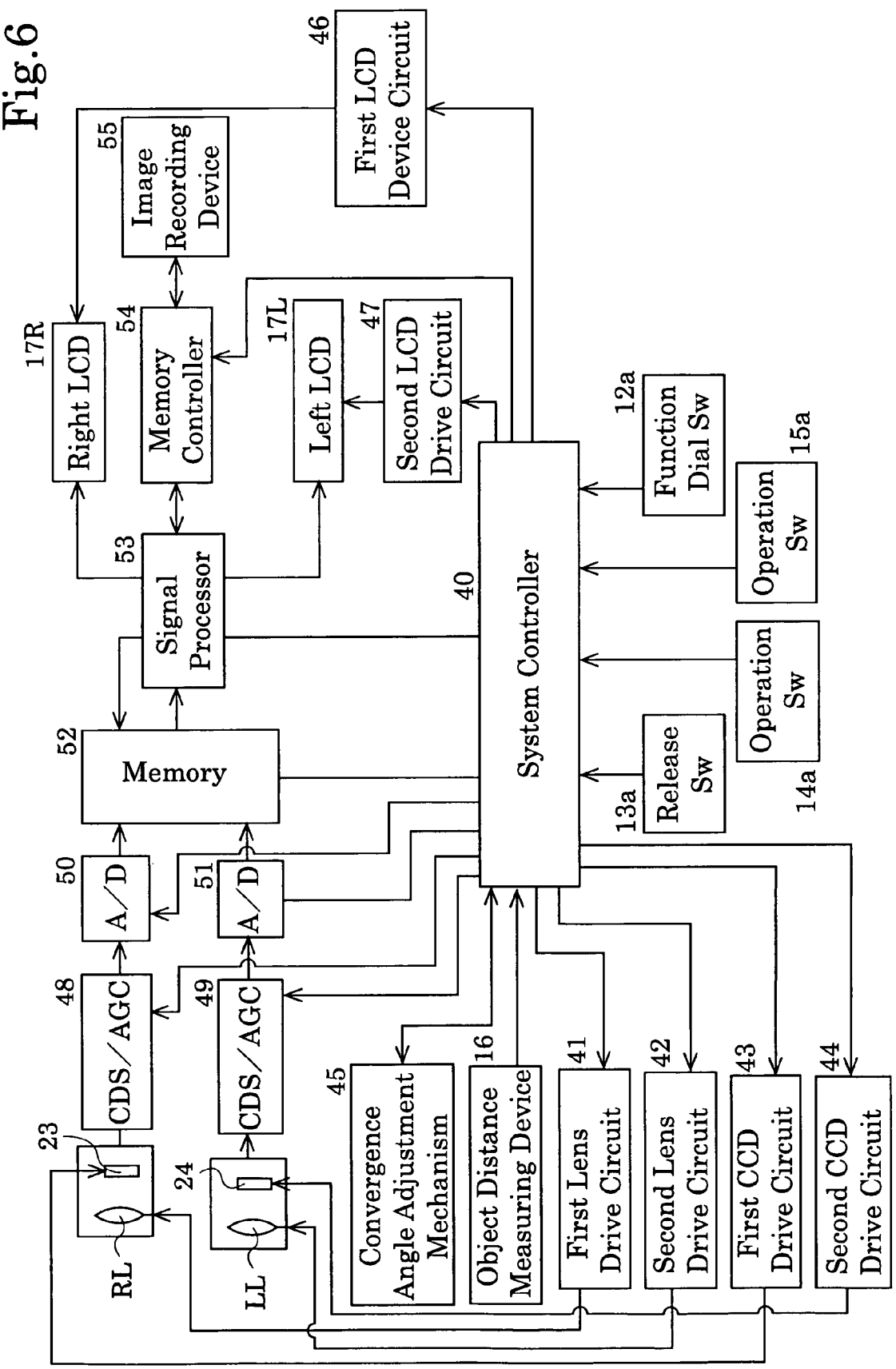

STEREO CAMERA

BACKGROUND OF THE INVENTION

1. Field of the Invention

The present invention relates to a stereo camera which takes a three-dimensional picture (stereoscopic photograph) for use in an optical system which gives a sensation of image depth to a viewer, due to a parallax produced between the viewer's eyes and convergence of the viewer's eyes.

2. Description of the Related Art

Upon taking a picture using a stereo camera (stereoscopic camera) in which images of an object are recorded by at least a pair of photographing optical systems in a symmetrical arrangement in the lateral direction, if the object distance is relatively small or the photographing optical systems are made of telephotographic optical systems, the photographic coverage (overlap) of right and left field angles is made small, and hence it is difficult to obtain a three-dimensional photograph.

A known solution thereto is to give an angle of convergence to the right and left photographing optical axes to thereby reduce the parallax between the eyes. However, in most conventional cameras, the provision of the angle of convergence is troublesomely carried out by a manual operation.

SUMMARY OF THE INVENTION

It is an object of the present invention to eliminate the drawbacks of the prior art mentioned above by providing a stereo camera which can take high-quality three-dimensional photographs by providing an appropriate angle of convergence between the right and left photographing optical axes without a complex operation, even if the object distance is relatively small or telephotographic photographing systems are used.

To achieve the object mentioned above, according to the present invention, a stereo camera is provided, including a pair of photographing optical systems arranged in a common plane so that a common photographing coverage occurs between a pair of photographing areas taken by the pair of photographing optical systems, an object distance measuring device, a convergence angle adjustment mechanism adapted to vary an angle of convergence defined by, and between, the optical axes of the pair of photographing optical systems, so as to adjust the amount of common photographic coverage of the pair of photographing optical systems, and a controller adapted to control the convergence angle adjustment mechanism in accordance with object distance data obtained by the object distance measuring device.

With this arrangement, no manual adjustment of the angle of convergence every time the object distance changes is necessary, and hence the operation efficiency can be enhanced.

In an embodiment, the pair of photographing optical systems are each included of a photographing lens and an image pickup device. The convergence angle adjustment mechanism includes a drive mechanism which rotates each photographing optical system to vary the angle of convergence in a direction to make median lines of field angles of the pair of photographing optical systems intersect each other.

For example, the drive mechanism can include a pair of rotary plates whose center axes of rotation are parallel with each other, each of the rotary plates supporting each respective pair of photographing optical systems; sector gears provided on each of the pair of rotary plates, the sector gears of one of the pair of rotary plates being in mesh with the sector gear the other of the pair of rotary plates; a sector worm wheel provided on one of the rotary plates; and a worm which is in mesh with the sector worm, the worm being secured to a drive shaft of a motor.

In another embodiment, the convergence angle adjustment mechanism includes a variable angle prism provided in a light path of each the pair of photographing optical systems.

In another embodiment, the convergence angle adjustment mechanism includes a drive mechanism which moves at least a part of each the pair of photographing optical system in a direction of the base length of the pair of photographing optical systems.

In an embodiment, each of the pair of photographing optical systems is provided with a respective first and second image pickup device, wherein when passive measurements of the object distance are carried out by the first and second image pickup devices, measurement points for each of the first and second image pickup devices are located on a side of the field angle thereof, with respect to the median line thereof, closest to a corresponding respective one of the second and first image pickup devices.

The stereo camera can be applied to an electronic still camera.

According to another aspect of the present invention, a stereo camera is provided, including at least a pair of photographing optical systems arranged in a common plane, and a convergence angle control device which varies an angle of convergence defined by and between the optical axes of the pair of photographing optical systems in accordance with object distance data.

According to another aspect of the present invention, a stereo camera is provided, including a pair of photographing optical systems arranged in a common plane so that a common photographing coverage occurs between a pair of photographing areas taken by the pair of photographing optical systems, an object distance measuring device, a photographic coverage adjustment device adapted to adjust an amount of the photographic coverage of the pair of photographing optical systems, and a controller adapted to control the photographic coverage adjustment device in accordance with object distance data obtained by the object distance measuring device.

The present disclosure relates to subject matter contained in Japanese Patent Application No. 11-193107 (filed on Jul. 7, 1999) which is expressly incorporated herein by reference in its entirety.

BRIEF DESCRIPTION OF THE DRAWINGS

The invention will be discussed below in detail with reference to the accompanying drawings, in which:

FIG. 6 is a block diagram of a circuit construction in a stereo camera according to a first embodiment of the present invention;

DESCRIPTION OF THE PREFERRED EMBODIMENTS

Figure 1:
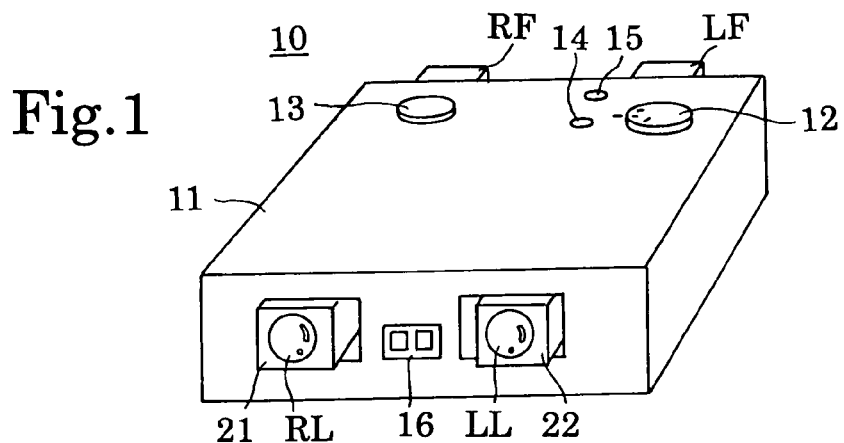
FIG. 1 is a perspective view of a first embodiment of a stereo camera according to the present invention.

Embodiments of the present invention will be discussed below with reference to the drawings. FIG. 1 shows a first embodiment of a stereo camera according to the present invention. The stereo camera 10 is an electronic still camera in which an object is photographed using an image pickup device and is comprised of a box-shaped housing 11 which is provided on the front portion thereof with a pair of right and left photographing optical systems RL and LL and on the rear portion thereof with a pair of right and left finder eyepiece portions RF and LF.

The housing 11 is provided on its upper surface with a function dial 12 which is adapted to turn the power source ON/OFF or select photographing modes, and a release button 13. A pair of operation buttons 14 and 15 are provided in the vicinity of the function dial 12 to select the frames or exposure correction value, etc. Also, an active type infrared object distance metering device 16 is provided on the front surface of the housing 11 and between the right and left photographing optical systems RL and LL.

Figure 4:
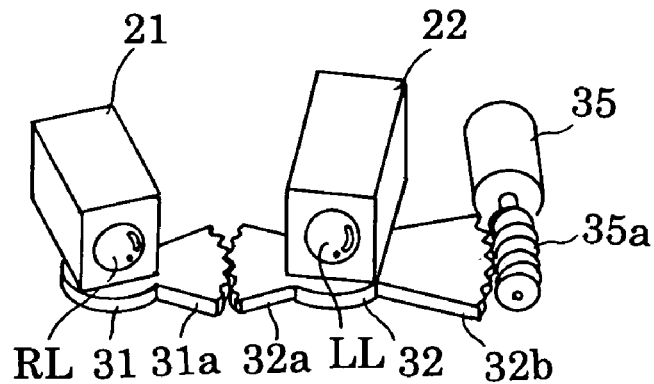
FIG. 4 is a perspective view of right and left photographing units and a drive mechanism thereof, in a stereo camera according to a first embodiment of the present invention.
Figure 5A:
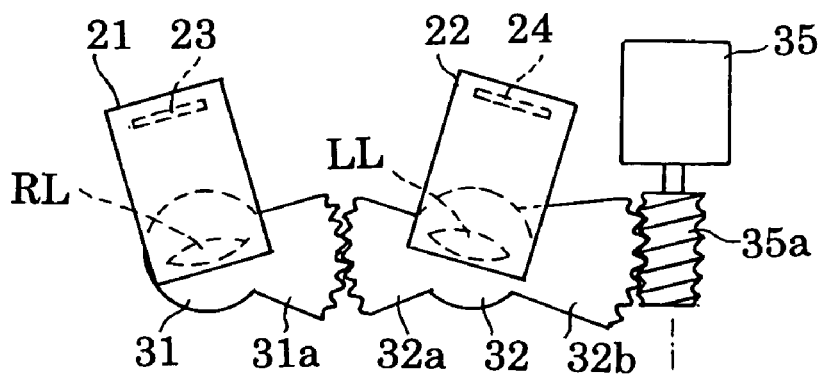
FIGS. 5A and 5B schematically show a plan view and a front elevational view, of right and left photographing units and a drive mechanism thereof, shown in FIG. 4.
Figure 5B:
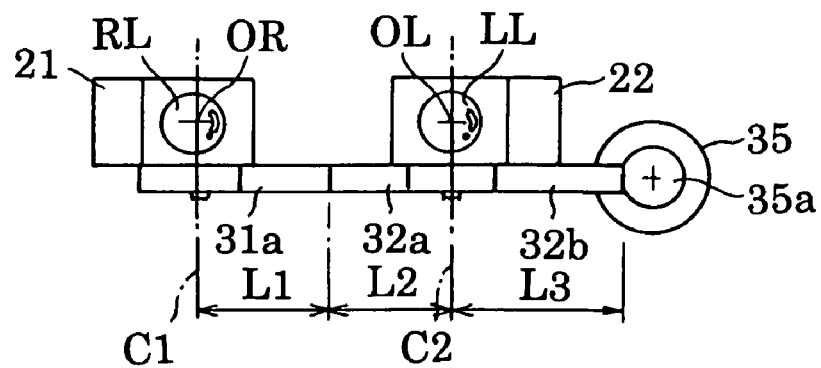

As can be seen from FIGS. 4, 5A and 5B, the right photographing optical system RL is secured to a right photographing unit 21 in the form of a box. Likewise, the left photographing optical system LL is secured to a left photographing unit 22 in the form of a box. The photographing optical systems RL and LL are each provided with an AF lens (not shown) movable along the optical axis. The pair of photographing units 21 and 22 in a symmetric arrangement in the lateral direction are identical in structure.

A right CCD (first image pickup device) 23 is provided in the photographing unit 21 behind the photographing optical system RL to pickup an object image formed by the photographing optical system RL. Likewise, a left CCD (second image pickup device) 24 is provided in the photographing unit 22 behind the photographing optical system LL to pickup an object image formed by the photographing optical system LL. The right and left photographing optical systems RL and LL are spaced at a distance equal to the base length d with respect to the center point P.

A right LCD 17R in which an object image picked-up by the right CCD 23 is indicated is built in the right finder eyepiece portion RF (see FIG. 6). Likewise, a left LCD 17L in which an object image picked-up by the left CCD 24 is indicated is built in the left finder eyepiece portion LF (see FIG. 6).

The right and left photographing units 21 and 22 are secured to rotary plates 31 and 32 whose center axes of rotation C1 and C2 are parallel. As shown in FIGS. 5A and 5B, the center axes C1 and C2 of the rotary plates 31 and 32 pass substantially through the centers of the corresponding photographing optical systems RL and LL and extend in the direction perpendicular to the optical axes OR and OL, respectively. The rotary plates 31 and 32 are provided with sector gears 31a and 32a which are always in mesh with each other. Consequently, the right and left rotary plates 31 and 32 are rotatable in opposite directions in association with each other through the sector gears 31a and 32a.

The rotary plate 32 to which the left photographing unit 22 is secured is provided with a sector worm wheel 32b on the side opposite to the sector gear 32a with respect to the center of rotation C2. The worm wheel 32b is always in mesh with a worm 35a secured to a drive shaft of a motor 35 provided in the vicinity of the rotary plate 32. Thus, when the motor 35 is driven, the right and left photographing units 21 and 22 are rotated about the respective centers of rotation C1 and C2 in association with each other. As can be seen in FIG. 5B, the diameter L1 of the gear portion 31a is identical to the diameter L2 of the gear portion 32a, and the diameter L3 of the worm wheel 32b is larger than the diameter L1 (L2). The rotary plates 31, 32, the gear portions 31a, 32a, the worm wheel 32b, the worm 35a, and the motor 35, etc., form a drive mechanism which constitutes a convergence angle adjustment mechanism 45 (FIG. 6).

Figure 2:
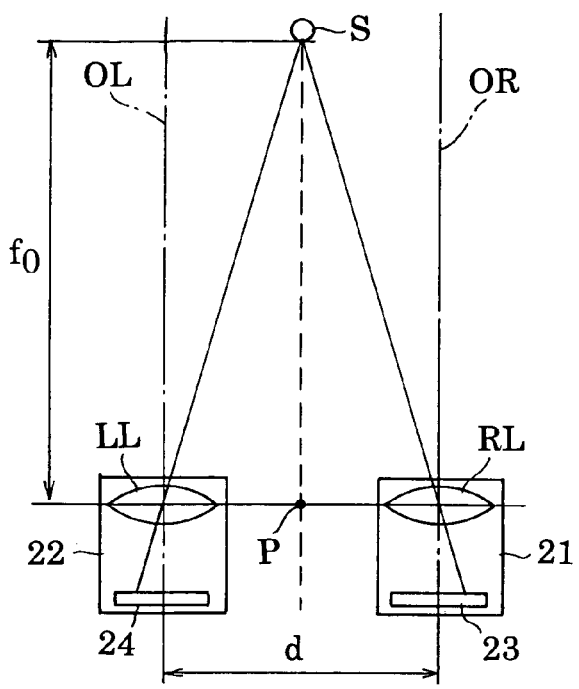
FIG. 2 is a schematic view of right and left photographing optical systems having substantially parallel photographing optical axes, in a stereo camera according to a first embodiment of the present invention.
Figure 3:
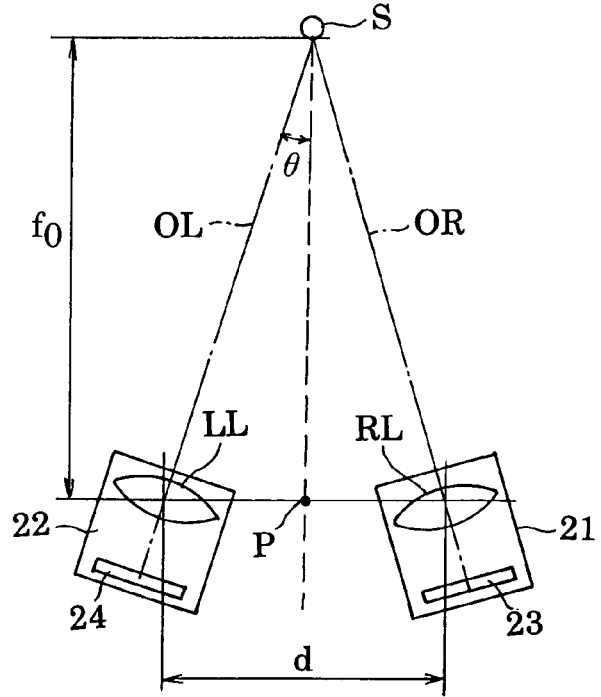
FIG. 3 is a schematic view of right and left photographing optical systems whose optical axes define therebetween an angle of convergence, in a stereo camera according to a first embodiment of the present invention.

In FIG. 2, the optical axes OR and OL of the right and left photographing units 21 and 22 are substantially parallel, i.e., the right and left photographing optical systems RL and LL have no angle of convergence. In FIG. 3, the optical axes OR and OL of the right and left photographing units 21 and 22 intersect at a point in front of the stereo camera 10, i.e., the right and left photographing optical systems RL and LL define an angle of convergence therebetween. In FIGS. 2 and 3, "d" designates the base length, "S" the main object, "$f_o$" the object distance, "θ" a half angle of convergence (i.e., 2θ represents the angle of convergence), and "P" the origin located at the median point of the right and left photographing optical systems RL and LL, respectively.

FIG. 6 shows a block diagram of a circuit of the stereo camera 10 according to the first embodiment. The stereo camera 10 has a system controller (control circuit) 40 in the form of a microcomputer, etc., for generally controlling the camera 10. Connected to the controller 40 are a release switch 13a which is turned ON/OFF in accordance with the operation of the release button 13, operation switches 14a and 15a which are respectively turned ON/OFF by the operation of the operation switches 14 and 15, and a function dial switch 12a whose state is varied in accordance with the operation of the function dial 12. The release switch 13a is a two-step switch which detects half depression and full depression of the release button 13.

An object distance measuring device 16, a first lens drive circuit 41 which drives the AF lens of the right photographing optical system RL, a second lens drive circuit 42 which drives the AF lens of the left photographing optical system LL, a first CCD drive circuit 43 which drives the right CCD 23, a second CCD drive circuit 44 which drives the left CCD 24, and a convergence angle adjustment mechanism 45 are connected to the system controller 40. In addition to the foregoing, a first LCD drive circuit 46 which drives the right LCD 17R and a second LCD drive circuit 47 which drives the left LCD 17L are connected to the system controller 40.

Also connected to the system controller 40 are a first CDS/AGC circuit 48 connected to the right CCD 23, a second CDS/AGC circuit 49 connected to the left CCD 24, a first A/D converter 50, a second A/D converter 51, a memory 52, a signal processor 53, and a memory controller 54. An image recording device 55 which records image data in a recording medium (not shown) such as a floppy disc or a flash memory, etc., is connected to the memory controller 54.

The image signal obtained through the right CCD 23 is subject to an A/D conversion by the first A/D converter 50 through the first CDS/AGC circuit 48 and is stored in the memory 52. Likewise, the image signal obtained through the left CCD 24 is subject to an A/D conversion by the second A/D converter 51 through the second CDS/AGC circuit 49 and is stored in the memory 52. The image signals stored in the memory 52 are processed by the signal processor 53 and are fed to the right LCD 17R and the left LCD 17L. Also, the signal processor 53 sends the same image signal as those fed to the right and left LCDs 17R and 17L to the memory controller 54. The image signal fed to the memory controller 54 is recorded on a recording medium such as a floppy disc or a flash memory, etc., by the image memory device 55 as image data when the release button 13 is depressed to turn the release switch 13a ON.

Figure 7:
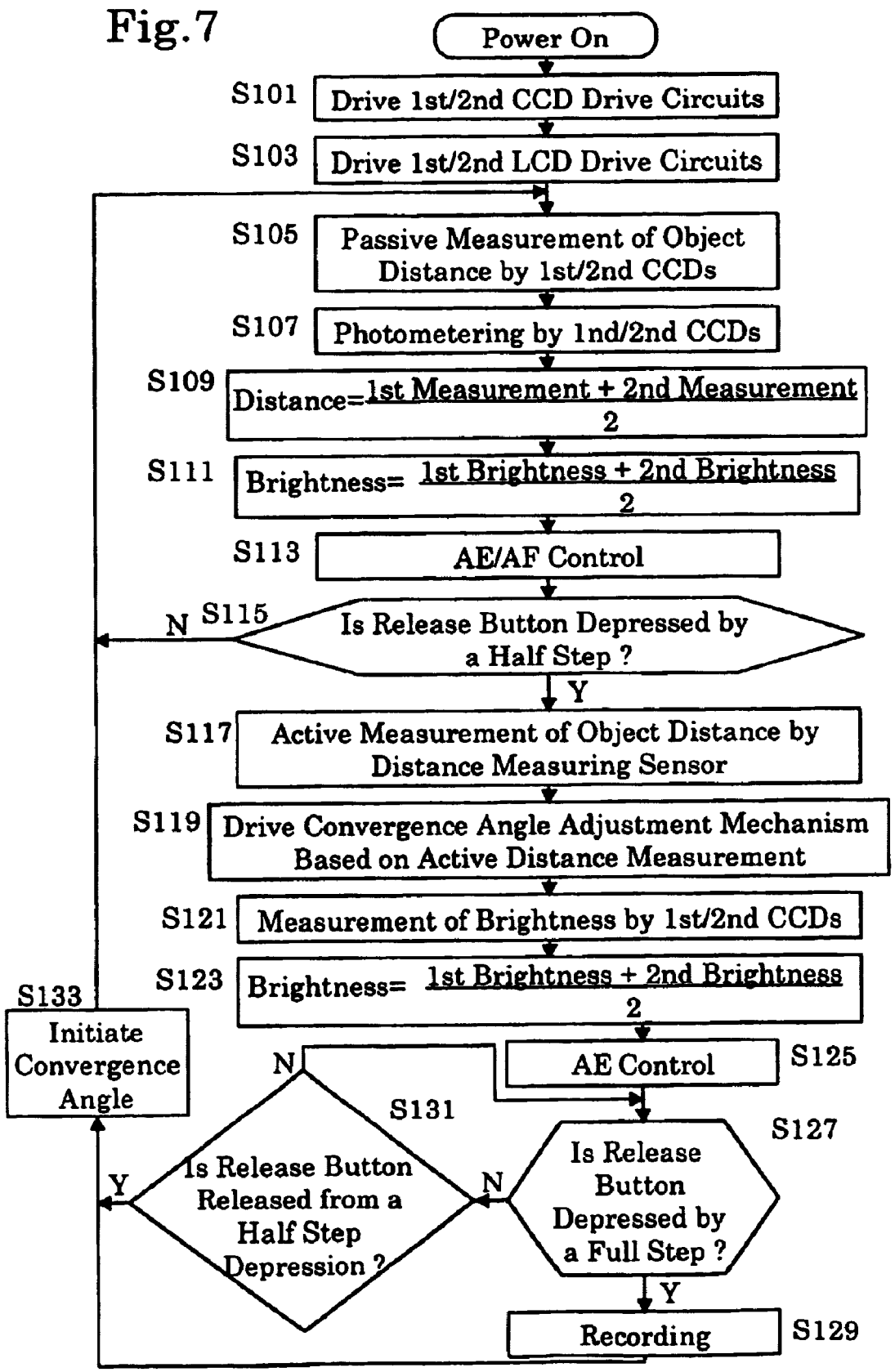
FIG. 7 is a flow chart of a photographing operation of a stereo camera according to a first embodiment of the present invention.

FIG. 7 shows a flow chart of the photographing operation in the stereo camera 10 according to the first embodiment. When the power source of the stereo camera 10 is turned ON, the right and left CCDs 23 and 24 are driven, and the right and left LCDs 17R and 17L are driven (S101, S103). Thereafter, a passive object distance measurement is carried out in each of the right and left CCD 23 and 24 (S105). In this operation, the measurement point for the right CCD 23 is located in the left side area of the field angle (e.g., substantially at the center of the left half of the field angle) with respect to the median line thereof. Likewise, the measurement point for the left CCD 24 is located in the right side area of the field angle (e.g., substantially at the center of the right half of the field angle) with respect to the median line thereof.

The photometering operation (brightness measurement) is carried out in each of the right and left CCDs 23 and 24 (S107). Thereafter, a mean value of the first measurement (first object distance) obtained by the right CCD 23 and the second measurement (second object distance) obtained by the left CCD 24 is calculated ([1st object distance+2nd object distance]/2). Subsequently, a mean value of the first photometering measurement (first brightness) obtained by the right CCD 23 and the second photometering measurement (second brightness) obtained by the left CCD 24 is calculated ([1st brightness+2nd brightness]/2) (S109, S111). Consequently, the AE/AF control operations are carried out in accordance with the mean object distance obtained at step S109 and the mean brightness obtained at step S111 (S113).

If it is detected that the release button 13 is depressed by half a step (S115), the control proceeds to step S117. If it is not detected that the release button 13 is depressed by half a step, the control is returned to step S105. Namely, the operations from step S105 to step S115 are repeated so long as the release button 13 is not depressed by half a step after the power source is turned ON.

If it is detected that the release button 13 is depressed by half a step at step S115, the active measurement of the object distance is carried out by the object distance measuring device 16 to obtain the object distance $f_o$. Consequently, the convergence angle adjustment mechanism 45 (i.e., the motor 35) is driven in accordance with the object distance to provide an angle of convergence between the right and left optical axes OR and OL (S117, S119).

Thereafter, the measurements of the brightness (photometering) are carried out again in the right and left CCDs 23 and 24, similar to those at step S107. Thereafter, similar to the operation at step S111, a mean value of the first measurement (first brightness) obtained by the right CCD 23 and the second measurement (second brightness) obtained by the left CCD 24 is calculated in accordance with ([1st brightness+2nd brightness]/2) (S121, S123). Consequently, the AE control is carried out in accordance with the mean brightness thus obtained (S125).

If it is detected that the release button 13 is depressed by a full step, the control proceeds to step S129. If it is not detected that the release button 13 is depressed by a full step, the control proceeds to step S131 (S127). If the release button 13 is depressed by a full step, the memory controller 54 and the image recorder 55 are driven to record the image data in the recording medium (not shown), such as a floppy disc or a flash memory (S129). After the recording operation is completed, the angle of convergence is returned to a predetermined initial value and the control is returned (S133).

If it is detected at step S127 that the release button 13 is not depressed by a full step, it is checked whether the release button 13 has been released from a half step depression (S131). If it is detected that the half depression of the release button 13 is not released, (i.e., the half depression of the release button 13 is maintained), the control is returned to step S127 to repeat steps 127 and S131. If it is detected that the half depression of the release button 13 is released, the control proceeds to step S133 (S131: Y; S133).

In the operation at step S119, the angle of convergence is determined in accordance with the following equation (1):

$$\theta = \tan^{-1}(d/2f_o) \quad (1)$$

wherein "$\theta$" represents the half angle of convergence (degrees), "$f_o$" represents the object distance (m), and "d" represents the base length (mm) between the right and left photographing optical systems RL and LL. The object distance $f_o$ is determined at step S117 in FIG. 7.

Table 1 below shows the relationship between the object distance $f_o$ and the angle $\theta$ when the base length is 65 mm (d=65 mm).

TABLE 1

| $f_o$ (m) | θ (°) |
|---|---|
| 1 | 1.861 |
| 2 | 0.931 |
| 5 | 0.372 |
| 10 | 0.186 |

Figure 8:
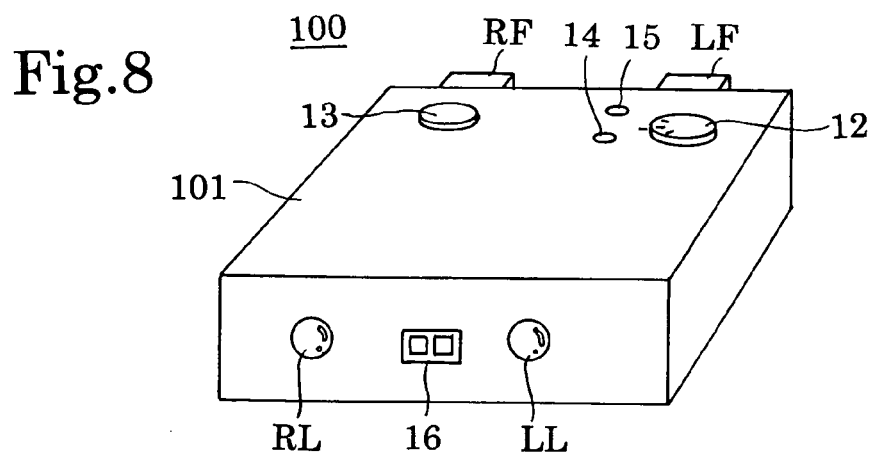
FIG. 8 is a perspective view of a second embodiment of a stereo camera according to the present invention.

FIG. 8 shows a second embodiment of a stereo camera according to the present invention. The stereo camera 100 is an electronic still camera similar to the stereo camera 10 in the first embodiment. The camera 100 includes a box-like housing 101 which is provided on the front surface thereof with right and left photographing optical systems RL and LL, and on the rear surface thereof with right and left finder eyepiece portions RF and LF, respectively. In the stereo camera 100 according to the second embodiment, elements corresponding to those in the first embodiment are designated with like numerals.

Unlike the first embodiment in which the right and left photographing units 21 and 22 are rotated to vary the angle of convergence, variable angle prisms (prisms whose apex angle is variable) RV and LV (see FIG. 9) are provided in each light path of the right and left photographing optical systems RL and LL, so that the variable angle prisms are driven to vary the angle of convergence, in the second embodiment. The right and left photographing units 21 and 22 are secured to the box-like housing 101 in the second embodiment.

Figure 9:
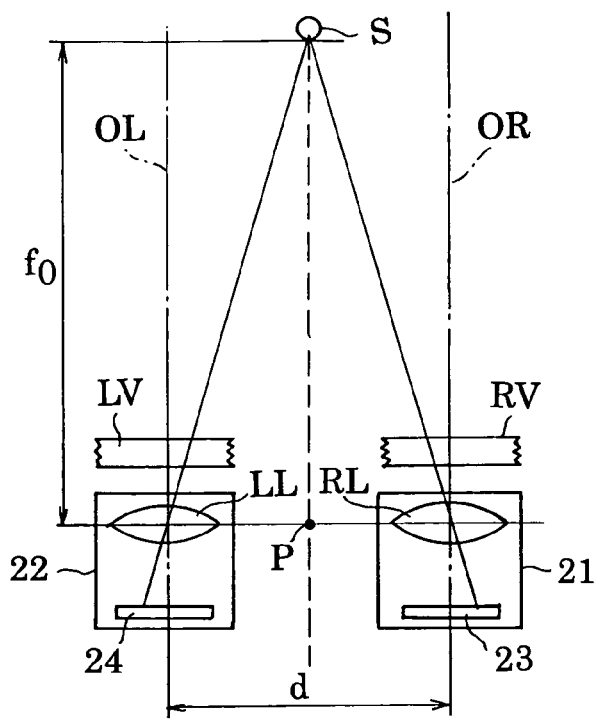
FIG. 9 is a schematic view of right and left photographing optical systems having substantially parallel photographing optical axes, in a stereo camera according to a second embodiment of the present invention.
Figure 10:
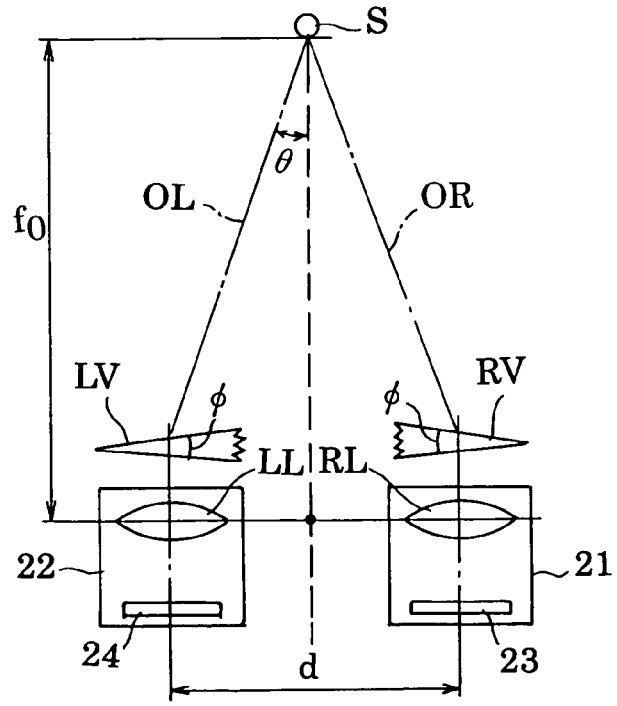
FIG. 10 is a schematic view of right and left photographing optical systems whose optical axes define therebetween an angle of convergence, in a stereo camera according to a second embodiment of the present invention.

The stereo camera 100 is provided with variable angle prisms RV and LV on the object sides of the right and left photographing optical systems RL and LL (see FIGS. 9 and 10). In FIG. 9, no angle of convergence is provided by the variable angle prisms Rv and LV, i.e., the optical axes OR and OL of the right and left photographing units 21 and 22 are parallel. In FIG. 10, an angle of convergence is provided by the variable angle prisms RV and LV. In FIGS. 9 and 10, "Φ" represents the variable apex angle (°) of the variable angle prisms RV and LV.

Figure 11:
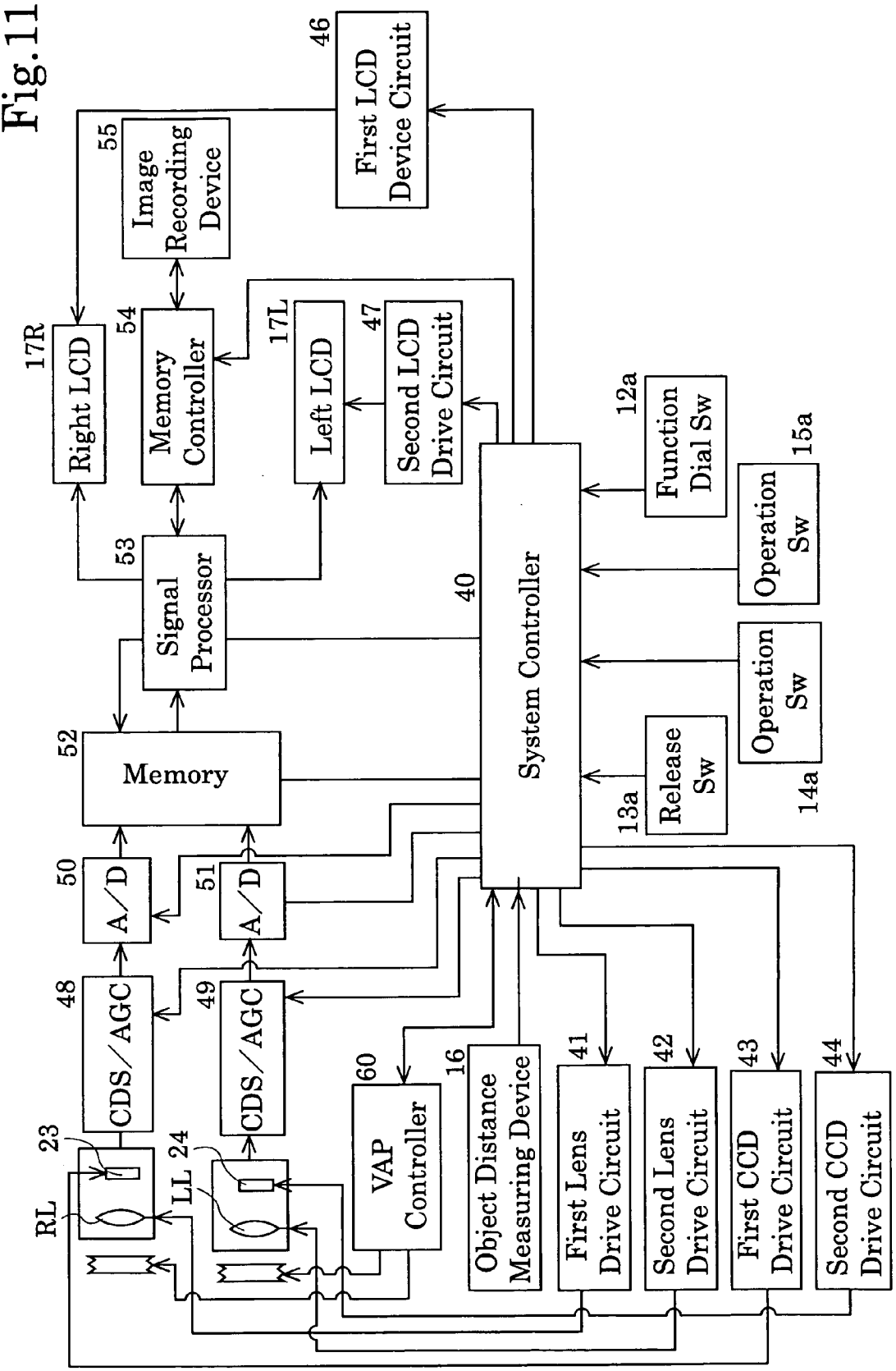
FIG. 11 is a block diagram of a circuitry in a stereo camera according to a second embodiment of the present invention.

FIG. 11 shows a block diagram of a circuit in a stereo camera 100 according to the second embodiment. In the second embodiment, the convergence angle adjustment mechanism 45 provided in the circuit of the stereo camera 10 in the first embodiment is replaced with a variable angle prism (VAP) control apparatus 60 connected between the variable angle prisms RV, LV and the system controller (control circuit) 40. The VAP control apparatus 60 is controlled by the system controller 40 and drives the variable angle prisms RV and LV in accordance with the object distance $f_o$ obtained to vary the apex angle Φ of the variable angle prisms RV and LV. Other circuit elements in the second embodiment are the same as those of the circuit in the first embodiment shown in FIG. 6. In the stereo camera 100 according to the second embodiment, the variable angle prisms RV, LV and the VAP control apparatus 60, etc., constitute the convergence angle adjustment mechanism.

Figure 12:
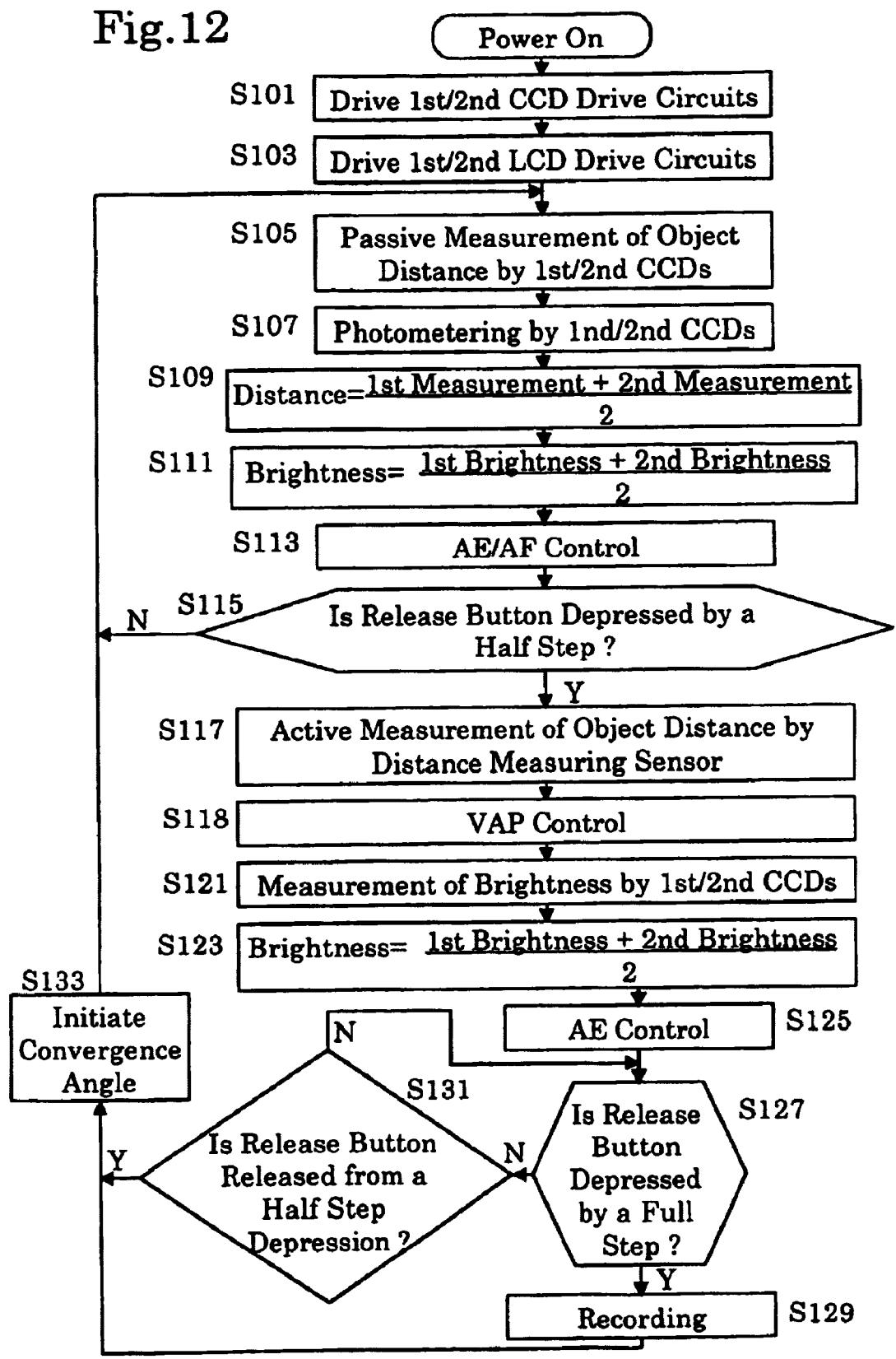
FIG. 12 is a flow chart of a photographing operation of a stereo camera according to a second embodiment of the present invention.

FIG. 12 shows a flow chart of the photographing operation of the stereo camera 100 according to the second embodiment. In the flow chart, the operation at step S119 in the flow chart of the photographing operation of the stereo camera 10 according to the first embodiment shown in FIG. 7 is replaced with the variable angle prism (VAP) control operation (S118). Other operations in FIG. 12 are identical to those in FIG. 7.

Namely, after the active measurement of the object distance at step S117 is completed, the variable angle prisms RV and LV are driven to vary the apex angles Φ of the variable angle prisms RV and LV, so that a desired angle of convergence can be provided between the right and left optical axes OR and OL (S118). Thereafter, the control proceeds to step S121.

At step S118 in the second embodiment, the variable apex angle Φ is determined in accordance with the following expression (2):

$$\Phi = (n-1)\theta \quad (2)$$

wherein "Φ" represents the variable apex angle (°) "n" represents the refractive index of the variable angle prisms RV and LV, and "θ" represents half of the convergence angle (deflection angle) (°), respectively.

Table 2 below shows a relationship between the object distance $f_o$ and the variable apex angle Φ when the base length d is 65 mm and the refractive index n is 1.5, respectively, in the stereo camera 100 according to the second embodiment.

TABLE 2

| $f_o$ (m) | Φ (°) |
|---|---|
| 1 | 0.931 |
| 2 | 0.466 |
| 5 | 0.186 |
| 10 | 0.093 |

Figure 13:
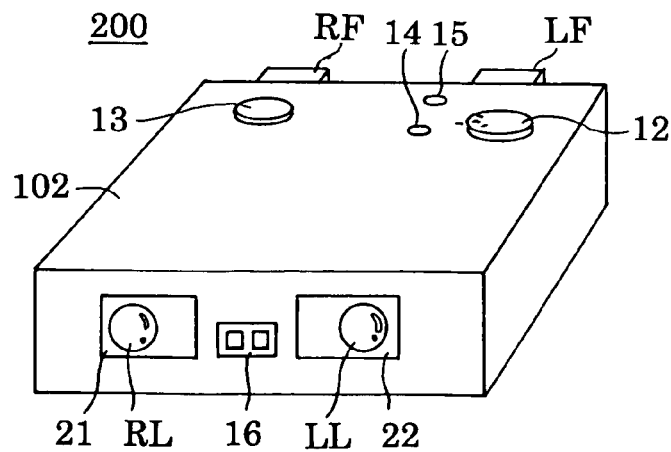
FIG. 13 is a perspective view of a third embodiment of a stereo camera according to the present invention.

FIG. 13 shows a third embodiment of a stereo camera according to the present invention. The stereo camera 200 is an electronic still camera similar to the stereo camera 10 in the first embodiment. The camera 200 includes a box-like housing 101 which is provided on the front surface thereof with a pair of right and left photographing optical systems RL and LL, and on the rear surface thereof with a pair of right and left finder eyepiece portions RF and LF, respectively. In the stereo camera 200 according to the third embodiment, elements corresponding to those in the first embodiment are designated with the same reference designators.

Unlike the first embodiment in which right and left photographing units 21 and 22 are rotated to vary the angle of convergence, or the second embodiment in which right and left variable angle prisms RV and LV are driven to vary the angle of convergence, in the third embodiment, the right and left photographing optical systems RL and LL are shifted (decentered) in a direction of the base length thereof to vary the angle of convergence. The right and left photographing optical systems RL and LL are movable in the lateral direction (right and left direction in FIGS. 14 and 15) to move away from or close to each other within the corresponding photographing units 21 and 22, in the stereo camera 200. Moreover, in the stereo camera 200, first and second lens shift actuators (lens drive mechanisms) 61 and 62 (FIG. 16) are provided to move the right and left photographing optical systems RL and LL in the directions away from or close to each other. The drive mechanism can be achieved by any known drive mechanism, for example, a combination of a motor and a cam mechanism or an electromagnetic drive mechanism having a coil combined with a magnet.

Figure 14:
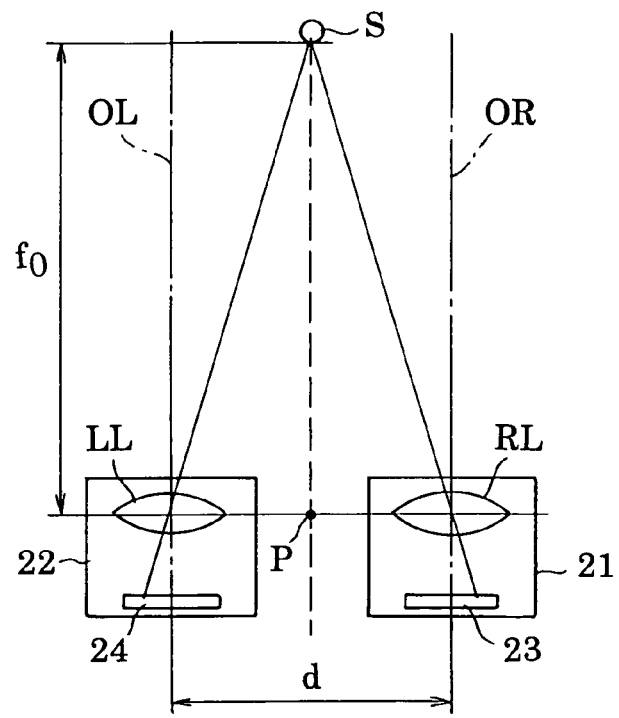
FIG. 14 is a schematic view of right and left photographing optical systems having substantially parallel photographing optical axes, in a stereo camera according to a third embodiment of the present invention.
Figure 15:
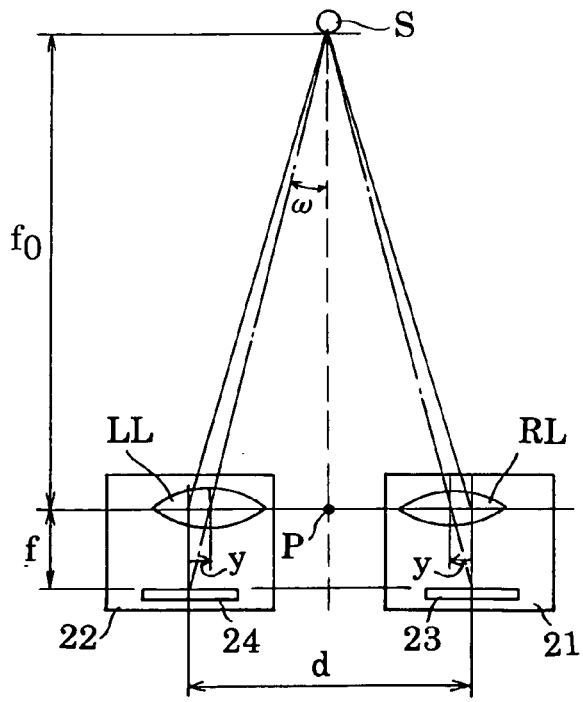
FIG. 15 is a schematic view of right and left photographing optical systems whose optical axes define therebetween an angle of convergence, in a stereo camera according to a third embodiment of the present invention.

In FIG. 14, the shift (off-axis amount) of the photographing optical systems RL and LL from the CCDs 23 and 24 in the photographing units 21 and 22 is zero, and hence no angle of convergence is provided (i.e., the optical axes OR and OL of the right and left photographing units 21 and 22 are parallel). In FIG. 15, the photographing optical systems RL and LL are shifted by y (mm) from the CCDs 23 and 24 in the photographing units 21 and 22, so that a predetermined angle of convergence is provided. In FIG. 15, "ω" represents half of the angle of convergence (°), "f" represents the focal length of the lens (mm), and "y" represents the shift amount (mm) of the photographing optical systems RL and LL, respectively.

Figure 16:
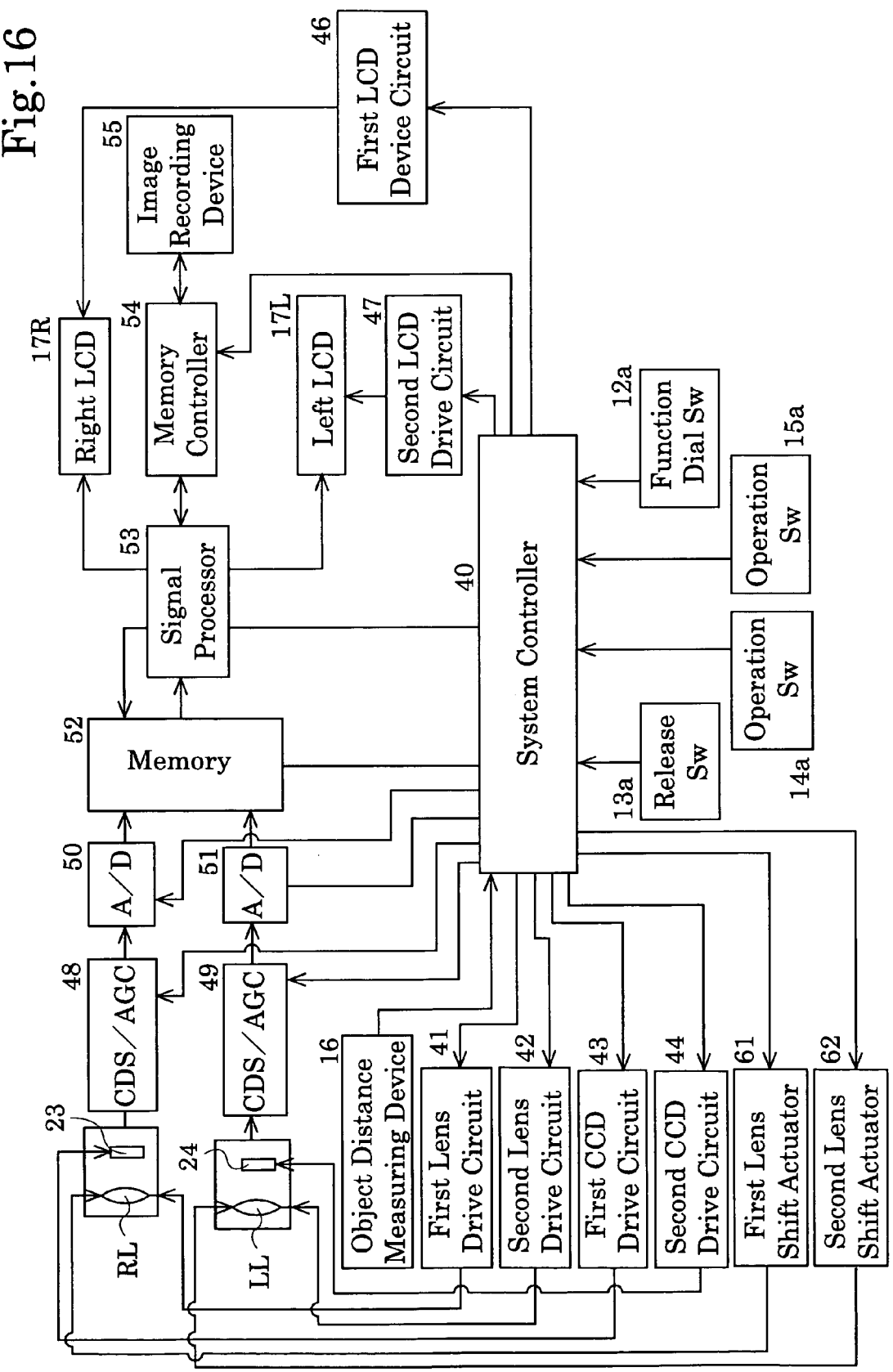
FIG. 16 is a block diagram of a circuit construction in a stereo camera according to a third embodiment of the present invention.

FIG. 16 shows a block diagram of a circuit in a stereo camera 200 according to the third embodiment. In the third embodiment, the convergence angle adjustment mechanism 45 provided in the circuit of the stereo camera 10 in the first embodiment is replaced with a first lens shift actuator 61 which is connected between the right photographing optical system RL and the system controller 40, and a second lens shift actuator 62 which is connected between the left photographing optical system LL and the system controller 40. The first lens shift actuator 61 is controlled by the system controller 40 to move the right photographing optical system RL by the amount of shift (displacement) "y" in accordance with the object distance "$f_o$" obtained. Likewise, the second lens shift actuator 62 is controlled by the system controller 40 to move the left photographing optical system LL by the amount of shift (displacement) "y" in accordance with the object distance "$f_o$" obtained. Other circuit elements in the third embodiment are the same as those of the circuit in the first embodiment shown in FIG. 6. In the stereo camera 200 according to the third embodiment, the first lens shift actuator 61 and the second lens shift actuator 62, etc., constitute a convergence angle adjustment mechanism.

Figure 17:
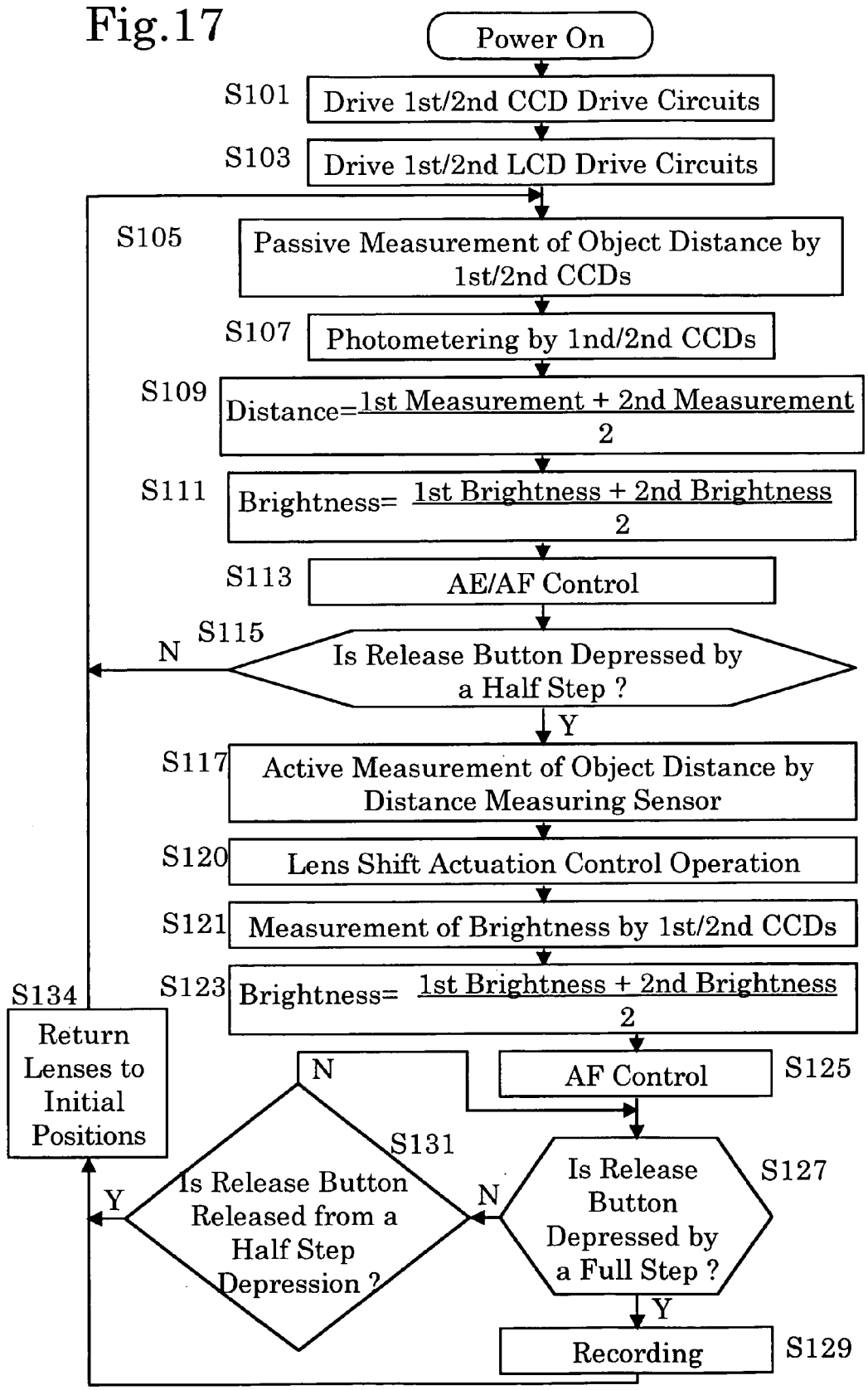
FIG. 17 is a flow chart of a photographing operation of a stereo camera according to a third embodiment of the present invention.

FIG. 17 shows a flow chart of the photographing operation of the stereo camera 200 according to the third embodiment. In the flow chart, the operations at steps S119 and S133 in the flow chart of the photographing operation of the stereo camera 10 according to the first embodiment shown in FIG. 7 are replaced with lens shift actuator control operation (S120) and the return operation of the lenses (photographing optical systems RL and LL) to the initial positions (S134), respectively. Other operations in FIG. 17 are the same as those in FIG. 7.

Namely, after the active measurement of the object distance at step S117 is completed, the lens shift actuators 61 and 62 are driven in accordance with the object distance thus obtained to move or shift the photographing optical systems RL and LL (S120). Thereafter, the control proceeds to step S121. At step S134, the photographing optical systems RL and LL are returned to the preset initial positions and thereafter, the control is returned to step S105.

At step S120 in the third embodiment, the amount of shift (displacement) is determined in accordance with the following expression (3);

$$y = f \cdot \tan \omega \quad (3)$$

$$\tan \omega = 0.5 d/(f_o + f)$$

wherein "y" represents the amount of shift (displacement) (mm), "f" represents the focal length of the lens (mm), "ω" represents half of the convergence angle (°), and "d" represents the base length between the right and left photographing optical systems RL and LL, respectively.

Although the variable angle prisms RV and LV are provided on the object sides of the right and left photographing optical systems RL and LL in the second embodiment, the arrangement of the variable angle prisms is not limited thereto. Namely, the variable angle prisms can be located at any positions within the light paths of the right and left photographing optical systems RL and LL. For instance, the same technical effect can be expected from an alternative arrangement in which the variable angle prisms RV and LV are provided within the corresponding photographing optical systems RL and LL.

Although, in the third embodiment, the right and left photographing optical systems RL and LL are moved with respect to the optical axes OR and OL thereof in the directions perpendicular to the optical axes to vary the angle of convergence, the invention is not limited thereto. For instance, in an alternative, it is possible to move at least part of the photographing optical systems RL and LL in directions normal to the optical axes OR and OL, respectively. In this alternative, the same effect as the previous embodiments can be obtained.

Although the above-mentioned embodiments are applied to an electronic still camera, the present invention can be equally applied to a stereo camera using silver halide films which replace the CCDs 23 and 24, respectively.

As may be understood from the foregoing, in a stereo camera according to the present invention, since the convergence angle adjustment mechanism is automatically controlled to vary the angle of convergence defined between the optical axes of a pair of photographing optical systems to adjust the photographic coverage of the pair of photographic optical systems so as to coincide with each other, in accordance with the object distance data, it is possible to easily set an appropriate angle of convergence between the right and left optical axes without need of a complex operation to thereby obtain a high-quality three-dimensional picture, even if the object distance is relatively small or the telephotographic photographing systems are used.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stereo camera comprising:
 a pair of photographing optical systems that produce a corresponding pair of photographing areas, said pair of photographing optical systems being located in a common plane to produce a common photographing coverage between each of the pair of photographing areas, each photographing optical system including an image pickup device that performs a passive distance measurement of an object distance;
 an object distance measuring device that performs an active distance measurement to measure a distance to an object;
 a convergence angle adjustment mechanism that varies an angle of convergence, defined by optical axes of said pair of photographing optical systems, to adjust an amount of the common photographic coverage of said pair of photographing optical systems; and
 a controller that controls each of the pair of photographing optical systems to perform the passive distance measurement of an object distance until such time as a release button is depressed at least by a half step, controls the object distance measuring device to perform the active distance measurement after the release button is depressed at least by a half step, and controls the convergence angle adjustment mechanism in accordance with object distance data corresponding to the measured distance to the object obtained by the active distance measurement.

2. The stereo camera according to claim 1, wherein
said pair of photographing optical systems each comprise
a photographing lens and an image pickup device, and
said convergence angle adjustment mechanism comprises
a drive mechanism which rotates each photographing optical system to vary the angle of convergence in a direction to make median lines of field angles of said pair of photographic optical systems intersect each other.

3. The stereo camera according to claim 2, wherein said drive mechanism comprises:
a pair of rotary plates having respective center axes of rotation in parallel with each other, said pair of rotary plates supporting said pair of photographing optical systems and having inter-meshing sector gears;
a sector worm wheel provided on one of said rotary plates; and
a worm which is in mesh with said sector worm wheel, said worm being secured to a drive shaft of a motor.

4. The stereo camera according to claim 1, wherein said convergence angle adjustment mechanism comprises a variable angle prism provided in a light path of each said pair of photographing optical systems.

5. The stereo camera according to claim 1, wherein said convergence angle adjustment mechanism comprises a drive mechanism that moves at least a part of each of said pair of photographing optical systems in a direction of a base length of said pair of photographing optical systems.

6. The stereo camera according to claim 1, said controller further controlling each of the pair of photographing optical systems to perform photometering operations until said release button is depressed at least by a half step.

7. The stereo camera according to claim 1, said controller further controlling each of the pair of photographing optical systems to perform autoexposure and/or autofocus operations until said release button is depressed at least by a half step.

* * * * *